United States Patent [19]
Elrod et al.

[11] Patent Number: 4,751,529
[45] Date of Patent: Jun. 14, 1988

[54] MICROLENSES FOR ACOUSTIC PRINTING

[75] Inventors: Scott A. Elrod, Menlo Park; Butrus T. Khuri-Yakub, Palo Alto; Calvin F. Quate, Stanford; Thomas R. VanZandt, Menlo Park, all of Calif.

[73] Assignee: Xerox Corporation, Stamford, Conn.

[21] Appl. No.: 944,490

[22] Filed: Dec. 19, 1986

[51] Int. Cl.[4] .......... G01D 15/16
[52] U.S. Cl. .......... 346/140 R; 310/335
[58] Field of Search .......... 346/140, 75; 310/335, 310/371

[56] References Cited

U.S. PATENT DOCUMENTS

| | | | |
|---|---|---|---|
| 3,958,559 | 5/1976 | Glenn | 310/335 X |
| 4,184,094 | 1/1980 | Kopez | 310/335 |
| 4,308,547 | 12/1981 | Lovelady et al. | 346/140 |
| 4,321,696 | 3/1982 | Kanda | 310/335 X |
| 4,384,231 | 5/1983 | Ishikawa | 310/335 |
| 4,580,148 | 4/1986 | Domoto et al. | 346/140 |

FOREIGN PATENT DOCUMENTS 941213 1/1981 U.S.S.R. .

OTHER PUBLICATIONS

Petersen, Kurt E., "Silicon as a Mechanical Material", Proceedings of the IEEE, vol. 70, No. 5, May 1982, pp. 421–457.
Krause, K. A., "Focusing Ink Jet Head", IBM Technical Disclosure Bulletin, vol. 16, No. 4, Sep. 1973.
Wise, K. D. et al., "Fabrication of Hemispherical Structures Using Semiconductor Technology for Use in Thermonuclear Fusion Research", J. Vac. Sci. Technol., vol. 16, No. 3, May/Jun. 1979, pp. 936–939.
Quate, Calvin F., "The Acoustic Microscope", Scientific American, vol. 241, No. 4, Oct. 1979, pp. 62–70.
Quate, Calvin F., "Acoustic Microscopy", American Institute of Physics, Physics Today, Aug. 1985, pp. 34–42.

*Primary Examiner*—Joseph W. Hartary

[57] ABSTRACT

A printhead for an acoustic printer comprises one or more acoustic microlenses, each of which brings an acoustic beam to focus approximately at the free surface of a pool of ink for ejecting individual droplets of ink from the pool on demand. As used herein, an "acoustic microlens" is defined as being an acoustic lens having an aperture diameter which is less than an order of magnitude greater than the wavelength of the incident acoustic wave (i.e., the acoustic wave which illuminates the lens).

10 Claims, 1 Drawing Sheet

MICROLENSES FOR ACOUSTIC PRINTING

FIELD OF THE INVENTION

This invention relates to acoustic printers and, more particularly, to microlenses for such printers.

BACKGROUND OF THE INVENTION

Acoustic printing is a potentially important direct marking technology. It still is in an early stage of development, but the available evidence indicates that it is likely to compare favorably with conventional ink jet systems for printing either on plain paper or on specialized recording media, while providing significant advantages of its own.

Drop on demand and continuous stream ink jet printing systems have experienced reliability problems because of their reliance upon nozzles with small ink ejection orifices which easily clog. Acoustic printing obviates the need for such nozzles, so it not only has greater intrinsic reliability than ordinary ink jet printing system, but also is compatible with a wider variety of inks, including inks which have relatively high viscosities and inks which contain pigments and other particulate components. Furthermore, it has been found that acoustic printing provides relatively precise positioning of the individual printed picture elements ("pixels"), while permitting the size of those pixels to be adjusted during operation, either by controlling the size of the individual droplets of ink that are ejected or by regulating the number of ink droplets that are used to form the individual pixels of the printed image. See a copending and commonly assigned United States patent application of Elrod et al, which was filed Dec. 19, 1986 under Ser. No. 944,286 on "Variable Spot Size Acoustic Printing".

When an acoustic beam impinges on a free surface (i. e., liquid/air interface) of a pool of liquid from beneath, the radiation pressure which the beam exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing ink Jet Head," *IBM Technical Disclosure Bulletin,* Vol 16, No. 4, September 1973, pp. 1168–1170 described an ink jet in which an acoustic beam emanating from a concave surface and confined by a conical aperture was used to propel ink droplets out through a small ejection orifice. Lovelady et at. U.S. Pat. No. 4,308,547, which issued Dec. 29, 1981 on a "Liquid Droplet Emitter," showed that the small ejection orifice of the conventional ink jet is unnecessary. To that end, they provided spherical piezoelectric shells as transducers for supplying focused acoustic beams to eject droplets of ink from the free surface of a pool of ink. They also proposed acoustic horns driven by planar transducers to eject droplets of ink from an ink coated belt.

Spherical piezoelectric transducers are suitable for use in low and moderate resolution acoustic printers. Such a transducer can be designed so that the acoustic beam it generates comes to an essentially unaberrated focus at or near the free surface of a pool of ink, thereby minimizing the variables that need to be controlled to achieve stable operation. Unfortunately, however, the mechanical strength of known piezoelectric materials imposes a design constraint on the minimum permissible thickness of a shell-like transducer, with the result that the upper end of the useful frequency range for these transducers is somewhere in the vicinity of 25 MHz. In a liquid, such as water, the wavelength of a 25 MHz acoustic beam is approximately 60 microns, so the upper limit on the printing resolution that can be achieved, using an ink having an acoustic velocity comparable to that of water, is only about 200 spots per inch. Furthermore, these shells are usually several milimeters in diameter.

To increase the resolution which can be achieved and to provide a less cumbersome and lower cost technique for manufacturing arrays of relatively stable acoustic droplet ejectors, a copending and commonly assigned United States patent application of Elrod et al, which was filed Dec. 19, 1986 under Ser. No. 944,698 on "Acoustic Lens Arrays for Ink Printing" is introducing acoustic lenses for performing the beam focusing function. That application is hereby incorporated by reference. However, the acoustic lens is not limited to use in arrays. Indeed, it has been found that the acoustic lens is extremely well suited to all forms of acoustic printing because its aperture need not be much larger than the wavelength of the acoustic wave in the solid which defines the lens.

SUMMARY OF THE INVENTION

In accordance with this invention, a printhead for an acoustic printer comprises one or more acoustic microlenses, each of which brings an acoustic beam to focus approximately at the free surface of a pool of ink for ejecting individual droplets of ink from the pool on demand. As used herein, an "acoustic microlens" is defined as being an acoustic lens having an aperture diameter which is less than an order of magnitude greater than the wavelength of the incident acoustic wave (i.e., the acoustic wave which illuminates the lens).

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENT

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
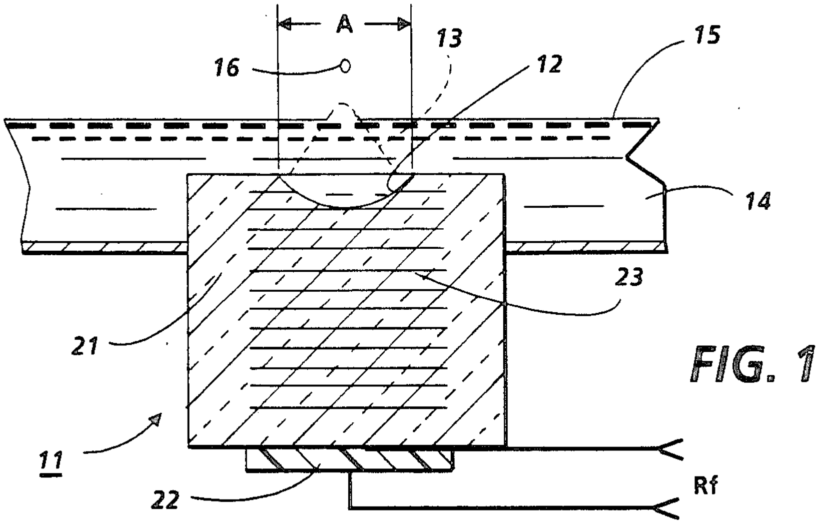
FIG. 1 is a sectional view of an acoustic printhead comprising an acoustic microlens which is constructed in accordance with the present invention.

Turning now to the drawings, and at this point especially to FIG. 1, there is a acoustic printhead 11 (shown only in relevant part) comprising an acoustic microlens 12 which is illuminated during operation by an ultrasonic acoustic wave, such that the lens 12 launches a converging acoustic beam 13 into a pool of ink 14. The focal length of the lens 12 is selected so that the beam 13 comes to focus on or near the free surface 15 of the pool 14, thereby enabling individual droplets 16 of ink to be ejected from the pool 14 on demand, as more fully described hereinbelow.

As illustrated, the microlenses 12 is defined by a small spherical depression or indentation which is formed in the upper surface of a solid substrate 21. A piezoelectric transducer 22 is deposited on or otherwise intimately mechanically coupled to the opposite or lower surface of the substrate 21, and a rf drive voltage (supplied by means not shown) is applied to the transducer 22 during operation to excite it into oscillation. The oscillation of the transducer 22 generates an ultrasonic acoustic wave 23 which propagates through the substrate 21 to illuminate the microlens 12.

To carry out this invention, the substrate 21 is composed of a material having an acoustic velocity which is much higher than the acoustic velocity of the ink 14, Typically, the ink 14 has an acoustic velocity of about 1 km/sec.-2 km/sec., so the substrate 21 consists of a material, such as silicon, silicon nitride, silicon carbide, alumina, sapphire, fused quartz, and certain glasses, having an acoustic velocity which exceeds that of the ink 14 sufficiently to reduce the aberrations of the acoustic beam 13 to an acceptably low level, if not effectively eliminate them. For example, the substrate 21 may be composed of a material having an acoustic velocity which is about 2.5 times faster than that of the ink 14 if small aberrations of the acoustic beam 13 are tolerable. If, on the other hand, it is necessary or desirable to reduce the aberrations of the acoustic beam 13 to a negligibly low level, the substrate 21 is fabricated from a material having an acoustic velocity which is at least four times faster than that of the ink 14. As will be appreciated, the higher acoustic velocity materials, such as silicon, silicon nitride, silicon carbide, alumina, and sapphire, are the materials of choice for those applications.

In accordance with the present invention, it has been found that the microlens 12 provides sufficient convergence of the acoustic beam 13 to eject or propel individual droplets 16 of ink from the pool 14 on demand, even though its aperture diameter, A, is less than an order of magnitude (i. e., ten times) greater than the wavelength of the acoustic wave 23 which is illuminating it. The focal length of the lens 12 typically is approximately equal to its aperture diameter, A, such that the lens 12 has a $F\# \approx 1$. That, in turn, means that the waist diameter of the acoustic beam 13 at focus is approximately equal to the wavelength, $\lambda_i$, of the beam 13 in the ink 14. Experiments have confirmed that the microlens 12 retains its ability to bring the acoustic beam 13 to an essentially diffraction limited focus, even if its aperture diameter, A, is only about 1.5 times the wavelength, $\lambda_s$, of the acoustic wave 23 in the substrate 21. While the minimum permissible aperture diameter to wavelength ratio has not been ascertained as yet, the performance of the small aperture microlenses which have been tested to date is surprisingly consistent and stable. Furthermore, it is compatible with the pixel size control techniques described in the above-identified Elrod et al application on "Variable Spot Size Acoustic Printing".

As a general rule, the transducer 22 has a relatively narrow band resonant response characteristic, so the radiation pressure of the acoustic beam 13 may controlled as required for drop on demand printing, not only by modulating the amplitude or duration of the rf drive voltage applied to the transducer 22, but also by modulating its frequency. The threshold pressure required to eject individual droplets 16 of ink from the pool 14 is a function of the particular ink that is employed and can be determined empirically to establish an appropriate reference level for the droplet ejection control process.

The relatively small aperture diameter, A, of the microlens 12 permits arrays of such lenses to be fabricated for various forms of parallel acoustic printing. See the aforementioned application of Elrod et al on "Acoustic Lens Arrays for Ink Printing". Even more generally, however, it facilitates the design of compact printheads for acoustic printing over a broad range of resolutions, including resolutions that are substantially higher than those which can be achieved using known alternative printhead technologies, such as the spherical piezoelectric transducer, for supplying a sharply focused acoustic beam. For example, microlens based printheads have been operated at 50 MHz. for 250 s.p.i. printing, which is typical of the resolution that is provided by commercially available, higher quality, non-acoustic printers.

Figure 2A:
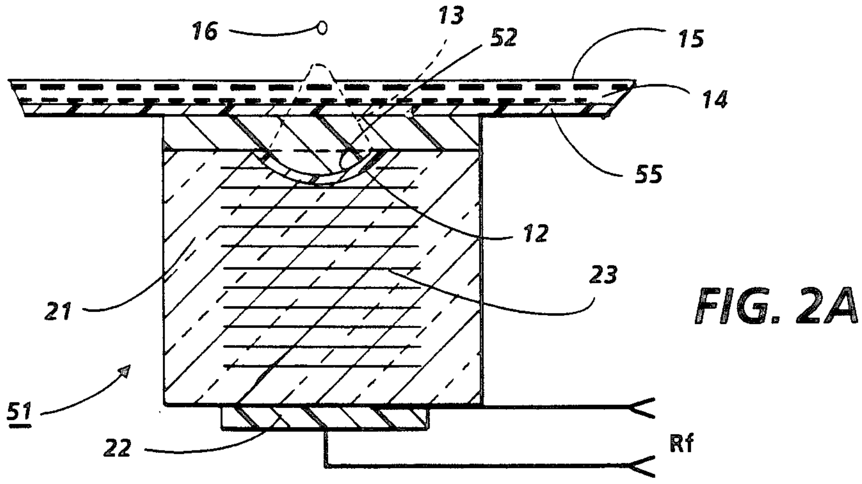
FIGS. 2A and 2B are sectional views of printheads having acoustic microlenses in combination with certain optional features and in alternative system configurations.
Figure 2B:
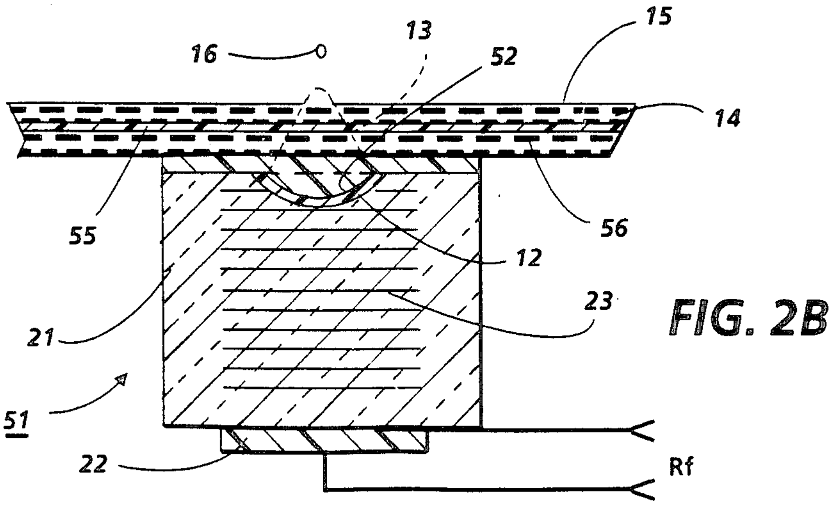

Referring to FIGS. 2A and 2B, it will be understood that various modifications and optional features may be incorporated into a microlens based printhead 51, without departing from the present invention. The basic components of the printhead 51 are essentially the same as those of the printhead 11 (FIG. 1), so like reference numerals have been used to identify like parts. However, as illustrated in FIGS. 2A and 2B, a $\lambda_z/4$ thick layer 52 of impedance matching material (where $\lambda_z$ = the wavelength of the acoustic beam 13 in the impedance matching material) may be coated on the outer concave surface of the microlens 12 to suppress unwanted reflections. Furthermore, an overcoating 53, which has an acoustic impedance and an acoustic velocity intermediate those of the ink 14 and the substrate 22, may be deposited on the lens bearing upper surface of the substrate 22 to planarize the printhead 51. As described in a copending and commonly assigned United States patent application of Elrod et al, which was filed Dec. 19, 1986 under Ser. No. 944,145, on a "Planarized Printheads for Acoustic Printing", the overcoating 53 fills the lens 12 and has a generally planar outer surface.

Microlens based printheads also are compatible with various system configurations, For example, as shown in FIG. 1, such a printhead 11 may be immersed in the pool of ink 14. Alternatively, as shown in FIGS. 2A and 2B, the ink 14 may be carried on a transport 55, such as a thin film of mylar, and the printhead 51 may be acoustically coupled to the ink 14, either by causing the transport 55 to bear against the printhead 51 (FIG. 2A) or by maintaining a thin layer of liquid 56 (FIG. 2B) between the printhead 51 and the transport 55.

CONCLUSION

In view of the foregoing, it will now be understood that the present invention provides an acoustic microlens which may be utilized to fabricate reliable printheads for acoustic printing over a broad range of resolutions, including resolutions which are sufficient for high quality printing. While spherical microlenses are provided for printing generally circular pixels, it will be appreciated that the geometry of the microlens may be modified to print non-circular pixels, such as elliptical pixels or elongated strip-like pixels.

What is claimed:

1. An acoustic printhead for ejecting individual droplets of ink on demand from a free surface of a supply of liquid ink, said ink having a predetermined acoustic velocity; said printhead comprising a solid substrate composed of a material having an acoustic velocity which is substantially higher than the acoustic velocity of said ink, said substrate being oriented with a first of its surfaces facing the free surface of said ink supply at a substantially constant distance therefrom, said first surface of said substrate being acoustically coupled to said ink and having at least one concave indentation formed therein to define an acoustic microlens having a predetermined aperture diameter and a predetermined focal length; and a piezoelectric transducer intimately coupled to an opposing surface of said substrate for generating an acoustic wave in said substrate for illuminating said microlens, such that said microlens launches a converging acoustic beam into said ink, with the focal length of said microlens being selected to cause said beam to come to focus approximately at said free surface;

said acoustic wave having a wavelength in said substrate such that the aperture diameter of said microlens is less than an order of magnitude greater than said wavelength.

2. The printhead of claim 1 wherein said concave indentation is coated with a quarter wave thick layer of impedance matching material to form an anti-reflective surface coating on said microlens.

3. The printhead of claim 1 wherein the first surface of said substrate is overcoated with a layer of material having an acoustic impedance and an acoustic velocity intermediate those of said ink and said substrate, and said overcoat fills said indentation and provides a generally planar output surface for said printhead.

4. The printhead of claim 3 wherein a quarter wave thick layer of impedance matching material is deposited on said concave indentation, intermediate said substrate and said overcoat, to form an anti-reflective surface coating on said microlens.

5. The printhead of any of claims 1–4 wherein said substrate is immersed in said ink supply.

6. The printhead of claim 5 wherein said concave indentation is essentially spherical to define a spherical microlens for printing generally circular pixels.

7. The printhead of any of claims 1–4 further including a thin film transport for carrying said ink supply, said transport bearing against said printhead to acoustically couple said microlens to said ink supply.

8. The printhead of claim 7 wherein said concave indentation is essentially spherical to define a spherical microlens for printing generally circular pixels.

9. The printhead of any of claims 1–4 further including a thin film transport for carrying said ink supply, and a layer of liquid between said printhead and said transport for acoustically coupling said microlens to said ink supply.

10. The printhead of claim 9 wherein said concave indentation is essentially spherical to define a spherical microlens for printing generally circular pixels.

* * * * *